United States Patent
Watanabe et al.

(10) Patent No.: US 6,205,156 B1
(45) Date of Patent: Mar. 20, 2001

(54) METHOD AND DEVICE FOR DATA TRANSMISSION AND RECEPTION USING TRANSMISSION PAUSE STATE AS RECEPTION TIMING

(75) Inventors: Tomoki Watanabe; Hironobu Fukunaga; Keiko Kumagai; Kazuhiro Hayakawa; Tatsuo Suzuki; Katsumi Kishida; Kazuo Tanaka, all of Kanagawaken (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 08/949,377

(22) Filed: Oct. 14, 1997

(30) Foreign Application Priority Data

Oct. 14, 1996 (JP) ......................................... 8-270538
Sep. 22, 1997 (JP) ......................................... 9-257306

(51) Int. Cl.[7] .................. H04L 12/413; H04L 12/403
(52) U.S. Cl. ........................ 370/474; 370/454; 370/474
(58) Field of Search .................................. 370/229, 230, 370/232, 235, 282, 400, 412, 413, 428, 631, 433, 437, 447, 448, 454, 463, 465, 468, 474; 375/222; 455/557

(56) References Cited

U.S. PATENT DOCUMENTS

| 4,712,214 | * | 12/1987 | Meltzer et al. | 370/300 |
|---|---|---|---|---|
| 4,774,707 | * | 9/1988 | Raychaudhuri | 370/447 |
| 5,193,151 | * | 3/1993 | Jain | 370/230 |
| 5,259,000 | * | 11/1993 | Kojima et al. | 375/222 |
| 5,384,770 | * | 1/1995 | Mays et al. | 370/300 |
| 5,394,392 | * | 2/1995 | Scott | 375/222 |
| 5,422,883 | * | 6/1995 | Hauris et al. | 370/431 |
| 5,440,545 | * | 8/1995 | Buchholz et al. | 370/474 |
| 5,463,616 | * | 10/1995 | Kruse et al. | 370/276 |
| 5,577,043 | * | 11/1996 | Guo et al. | 370/294 |
| 5,611,038 | * | 3/1997 | Shaw et al. | 395/500 |
| 5,654,969 | * | 8/1997 | Wilhelmsson | 370/460 |
| 5,682,386 | * | 10/1997 | Arimilli et al. | 370/468 |
| 5,699,361 | * | 12/1997 | Ding et al. | 370/468 |

* cited by examiner

Primary Examiner—Chau Nguyen
Assistant Examiner—Chiho Andrew Lee
(74) Attorney, Agent, or Firm—Kilpatrick Stockton

(57) ABSTRACT

A data transmission and reception scheme capable of reducing required devices in the data transmission and reception system for an economical advantage, realizing the concurrent data delivery to a plurality of data reception devices, and allowing each one of a plurality of data reception devices to start the data reception at arbitrary timing. In a system for transmitting data from a data transmission device to unspecified many data reception devices that make asynchronous connections, the data transmission device carries out the repetitive transmission by repeating the operations of transmitting a prescribed amount of data to be transmitted by applying a prescribed signal conversion and then pausing the signal conversion processing for a prescribed period of time so as to provide a transmission pause state in the transmission signals which is to be utilized as a reception timing at each data repcetion device. At each data reception device, the transmission pause state in the transmission signals are detected at an arbitrary timing, and the reception of the transmission data is started by using the detected transmission pause state as the reception timing.

7 Claims, 15 Drawing Sheets

METHOD AND DEVICE FOR DATA TRANSMISSION AND RECEPTION USING TRANSMISSION PAUSE STATE AS RECEPTION TIMING

BACKGROUND OF THE INVENTION

1. Field of the Invention

The present invention relates to a data transmission and reception technique, and more particularly, to a method and a device for data transmission and reception for realizing a data delivery from a single data transmission device to a plurality of data reception devices as well as a simultaneous data delivery to a plurality of data reception devices economically.

2. Description of the Background Art

A conventional technique in a case of transmitting and receiving data using a communication channel is that, after a physical line is connected and a procedure to make a preparation for the data transmission and reception is carried out, the transparent one-to-one data communication is carried out while maintaining a logical connection state. Also, in a case of communications in the speech bandwidth as in a case of general subscriber telecommunications, the modulation and demodulation (modem) technique for converting digital data into analog signals in the speech bandwidth or vice versa is used. As the standard for this modulation and demodulation, V.21, V.22, V.22bis, V.32, V.32bis, V.34, etc. are defined for the data communications, but these standards are all for realizing the one-to-one bi-directional data communications.

However, the above described conventional scheme is not economical in a case of carrying out the data transmission and reception between one data transmission device and a plurality of data reception devices, because it requires as many devices (such as modems) as a total number of data transmitting and receiving pairs involved. In addition, when a plurality of reception requests are made simultaneously, there can be a problem in that the devices on the transmitting side may run out short so that it may not be possible to receive the requested data.

SUMMARY OF THE INVENTION

It is therefore an object of the present invention to provide a method and a device for data transmission and reception which are capable of reducing required devices in the data transmission and reception system for an economical advantage, realizing the concurrent data delivery to a plurality of data reception devices, and allowing each one of a plurality of data reception devices to start the data reception at arbitrary timing.

According to one aspect of the present invention there is provided a data transmission method for transmitting data from a data transmission device to unspecified many data reception devices that make asynchronous connections, comprising: a first step for applying a prescribed signal conversion to a prescribed amount of transmission data to obtain transmission signals, and transmitting the transmission signals; a second step for pausing the signal conversion for a prescribed period of time after the first step so as to provide a transmission pause state in the transmission signals which is to be utilized as a reception timing at each data reception device; and a third step for carrying out a repetitive transmission by repeating the first step and the second step.

According to another aspect of the present invention there is provided a data reception method for receiving transmission signals of transmission data transmitted from a data transmission device at each data reception device among unspecified many data reception devices that make asynchronous connections, comprising: a first step for detecting a transmission pause state provided in the transmission signals by the data transmission device; and a second step for receiving the transmission data by starting a data conversion of received transmission signals, by using the transmission pause state detected by the first step as a reception timing.

According to another aspect of the present invention there is provided a data transmission and reception method for carrying out data transmission and reception between a data transmission device and unspecified many data reception devices that make asynchronous connections, comprising: a first step for applying a prescribed signal conversion to a prescribed amount of transmission data to obtain transmission signals, and transmitting the transmission signals, at the data transmission device; a second step for pausing the signal conversion for a prescribed period of time after the first step so as to provide a transmission pause state in the transmission signals which is to be utilized as a reception timing at each data reception device, at the data transmission device; a third step for carrying out a repetitive transmission by repeating the first step and the second step, at the data transmission device; a fourth step for detecting the transmission pause state provided in the transmission signals, at each data reception device; and a fifth step for receiving the transmission data by starting a data conversion of received transmission signals, by using the transmission pause state detected by the fourth step as a reception timing, at each data reception device.

According to another aspect of the present invention there is provided a data transmission device for transmitting data to unspecified many data reception devices that make asynchronous connections, comprising: a signal conversion unit for applying a prescribed signal conversion to a prescribed amount of transmission data to obtain transmission signals, and transmitting the transmission signals; and a control unit for controlling the signal conversion unit so that the signal conversion is paused for a prescribed period of time after a signal transmission by the signal conversion unit so as to provide a transmission pause state in the transmission signals which is to be utilized as a reception timing at each data reception device, and a repetitive transmission is carried out by repeating the signal transmission and a pause.

According to another aspect of the present invention there is provided a data reception device for receiving transmission signals of transmission data transmitted from a data transmission device to unspecified many data reception devices that make asynchronous connections, comprising: a pause detection unit for detecting a transmission pause state provided in the transmission signals by the data transmission device; and a data conversion unit for receiving the transmission data by applying a data conversion to received transmission signals; and a control unit for controlling the data conversion unit so as to start the data conversion of received transmission signals by using the transmission pause state detected by the pause detection unit as a reception timing.

Other features and advantages of the present invention will become apparent from the following description taken in conjunction with the accompanying drawings.

DETAILED DESCRIPTION OF THE PREFERRED EMBODIMENTS

First, the main features of the present invention will be briefly outlined.

The present invention is basically directed to a system in which signals obtained from data to be transmitted at the transmitting side are distributed and delivered to a plurality of receiving sides, and the data are reconstructed at the receiving sides, where it is made possible for each one of a plurality of receiving side devices to start the reception at arbitrary timing, with respect to a single transmitting side device.

Namely, in a system for transmitting data from a data transmission device to unspecified many data reception devices that make asynchronous connections, the data transmission device carries out the repetitive transmission by repeating the operations of transmitting a prescribed amount of data to be transmitted by applying a prescribed signal conversion and then pausing the signal conversion processing for a prescribed period of time so as to provide a transmission pause state in the transmission signals which is to be utilized as a reception timing at each data repcetion device. At each data reception device, the transmission pause state in the transmission signals are detected at an arbitrary timing, and the reception of the transmission data is started by using the detected transmission pause state as the reception timing.

Consequently, it suffices to provide only one data transmission device with respect to a plurality of data reception devices, and it is possible to economize devices required for the data transmission and reception, and realize the simultaneous and asynchronous data transmission and reception with respect to a plurality of data reception devices, that is, the concurrent transmission with respect to a plurality of data reception devices and the reception start at an arbitrary timing for each data reception device.

In the following, various embodiments of this data transmission and reception method of the present invention as well as the data transmission device and the data reception device for realizing this data transmission and reception method will be described in detail.

<First Embodiment>

Figure 1:
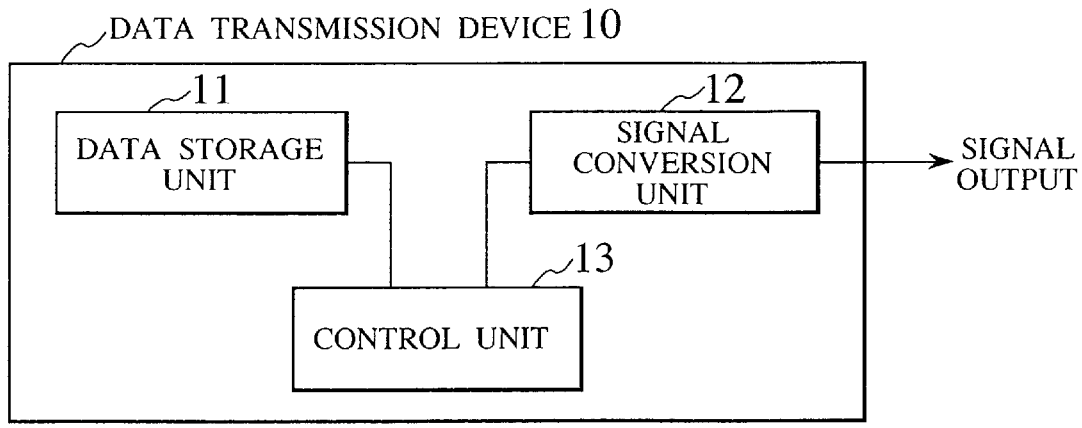
FIG. 1 is a block diagram of a data transmission device according to the first embodiment of the present invention.

FIG. 1 shows a configuration of a data transmission device according to the first embodiment of the present invention. This data transmission device 10 of FIG. 1 comprises a data storage unit 11, a signal conversion unit 12, and a control unit 13.

The data storage unit 11 is a unit for storing data to be transmitted by the data transmission device 10, which can be realized by a device such as semiconductor memory, magnetic memory, magnetic tape, etc., or a combination of such devices in which digital data can be stored and from which digital data can be outputted according to an external control.

The signal conversion unit 12 is a unit for converting data to be transmitted by the data transmission device 10 into prescribed signals, which can be realized by a suitable circuit depending on a type of signals to be outputted, such as a modulation circuit for the analog telephone in a case of outputting signals in the analog telephone bandwidth, for example.

The control circuit 13 is a unit for controlling the data transmission by the data transmission device 10, which can be realized by a micro-computer, for example.

Figure 2:
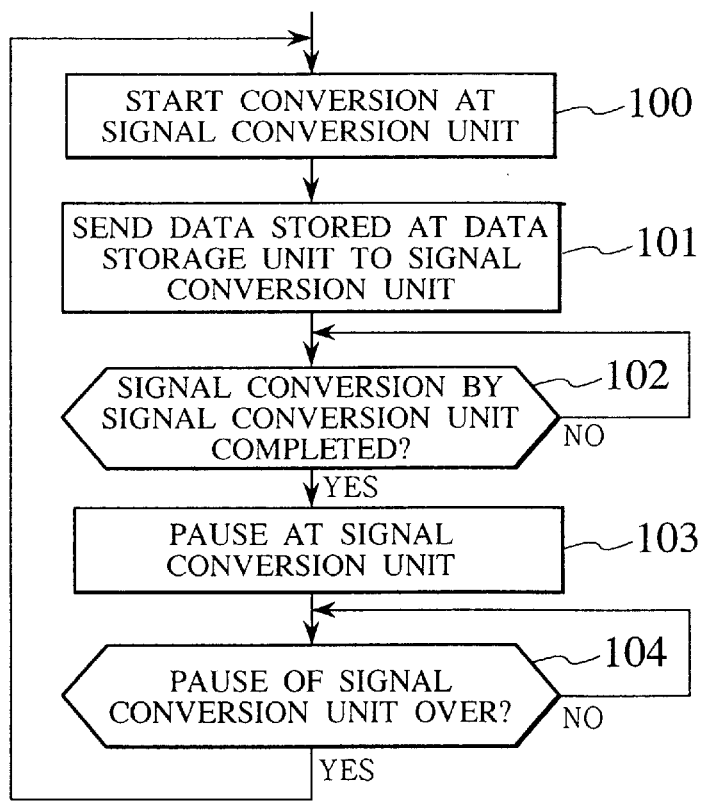
FIG. 2 is a flow chart for the operation of a data transmission device according to the first embodiment of the present invention.

FIG. 2 shows a flow chart for the operation of the data transmission device 10 of FIG. 1, which is carried out as follows.

Here, it is assumed that the data to be transmitted by the data transmission device 10 are stored in the data storage unit 11 in advance. As for the data storing into the data storage unit 11, data can be supplied through a communication channel from external, or through a recording medium such as magnetic disk, FD, ROM, etc., but this is not essential to the present invention so that it will not be described in detail here.

First, the control unit 13 commands the start of the signal conversion to the signal conversion unit 12 (step 100). Then, the control unit 13 sequentially sends the data stored in the data storage unit 11 to the signal conversion unit 12 (step 101).

The signal conversion unit 12 generates signals from the data supplied from the data storage unit 11 and outputs the generated signals. For example, when the signal conversion unit 12 is a modulation circuit for the analog telephone, this signal generation and output can be realized by carrying out the modulation according to the modulation standard such as ITU-V.17 or V.29.

The control unit 13 next confirms that the conversion and output of the data sent at the step 101 is completed at the signal conversion unit 12 (step 102), and then commands a pause to the signal conversion unit 12.

In response to this pause command from the control unit 13, the signal conversion unit 12 carries out a pause operation (step 103). This pause operation by the signal conversion unit 12 at the step 103 functions to provide a transmission pause state in the transmission signals which will be utilized as a reception timing at each data reception device as will be described below.

Here, the pause state can be any state which can be clearly distinguished from a normal signal transmission state. For example, the pause state can be realized in a form of a silent section if the signals of the analog telephone bandwidth are to be transmitted, or in a form of a prescribed signal level or data bit sequence.

The control unit 13 next confirms the pause of the signal conversion unit 12 over a prescribed period of time (step 104), and then the operation returns to the step 100 to repeat the above described series of operations so as to realize the transmission of the data stored in the data storage unit 11.

<Second Embodiment>

Figure 3:
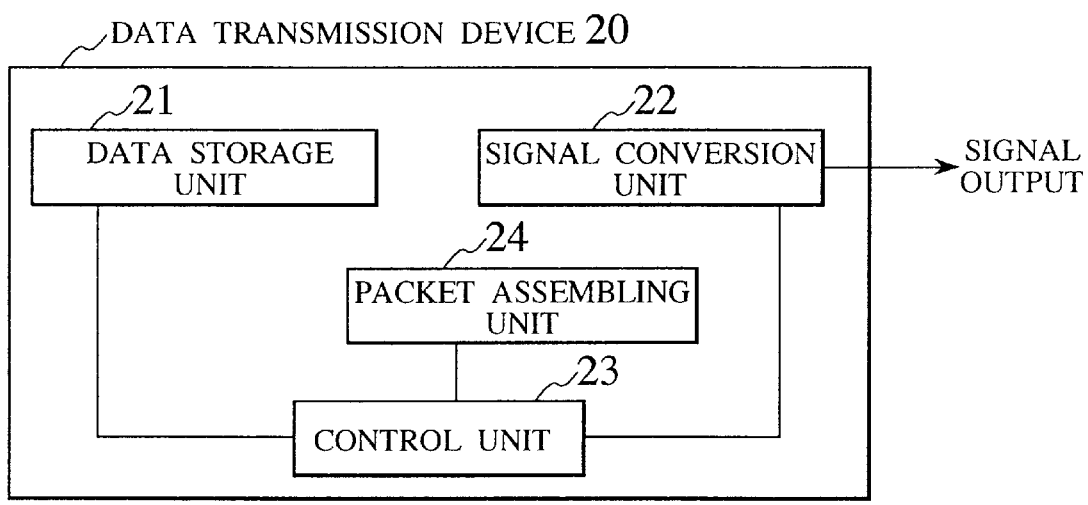
FIG. 3 is a block diagram of a data transmission device according to the second embodiment of the present invention.

FIG. 3 shows a configuration of a data transmission device according to the second embodiment of the present invention. This data transmission device 20 of FIG. 3 comprises a data storage unit 21, a signal conversion unit 22, a control unit 23, and a packet generation unit 24.

The data storage unit 21 is a unit for storing data to be transmitted by the data transmission device 20, which can be realized by a device such as semiconductor memory, magnetic memory, magnetic tape, etc., or a combination of such devices in which digital data can be stored and from which digital data can be outputted according to an external control.

The signal conversion unit 22 is a unit for converting data to be transmitted by the data transmission device 20 into prescribed signals, which can be realized by a suitable circuit depending on a type of signals to be outputted, such as a modulation circuit for the analog telephone in a case of outputting signals in the analog telephone bandwidth, for example.

The control circuit 23 is a unit for controlling the data transmission by the data transmission device 10, which can be realized by a micro-computer, for example.

The packet generation unit 24 is a unit for generating one or more packets from a series of data, which can be realized by a device such as micro-computer. In this second embodiment, this packet generation unit 24 is added to the data transmission device 10 of FIG. 1. Note that the same micro-computer device can be used in realizing the control unit 23 and the packet generation unit 24.

Figure 4:
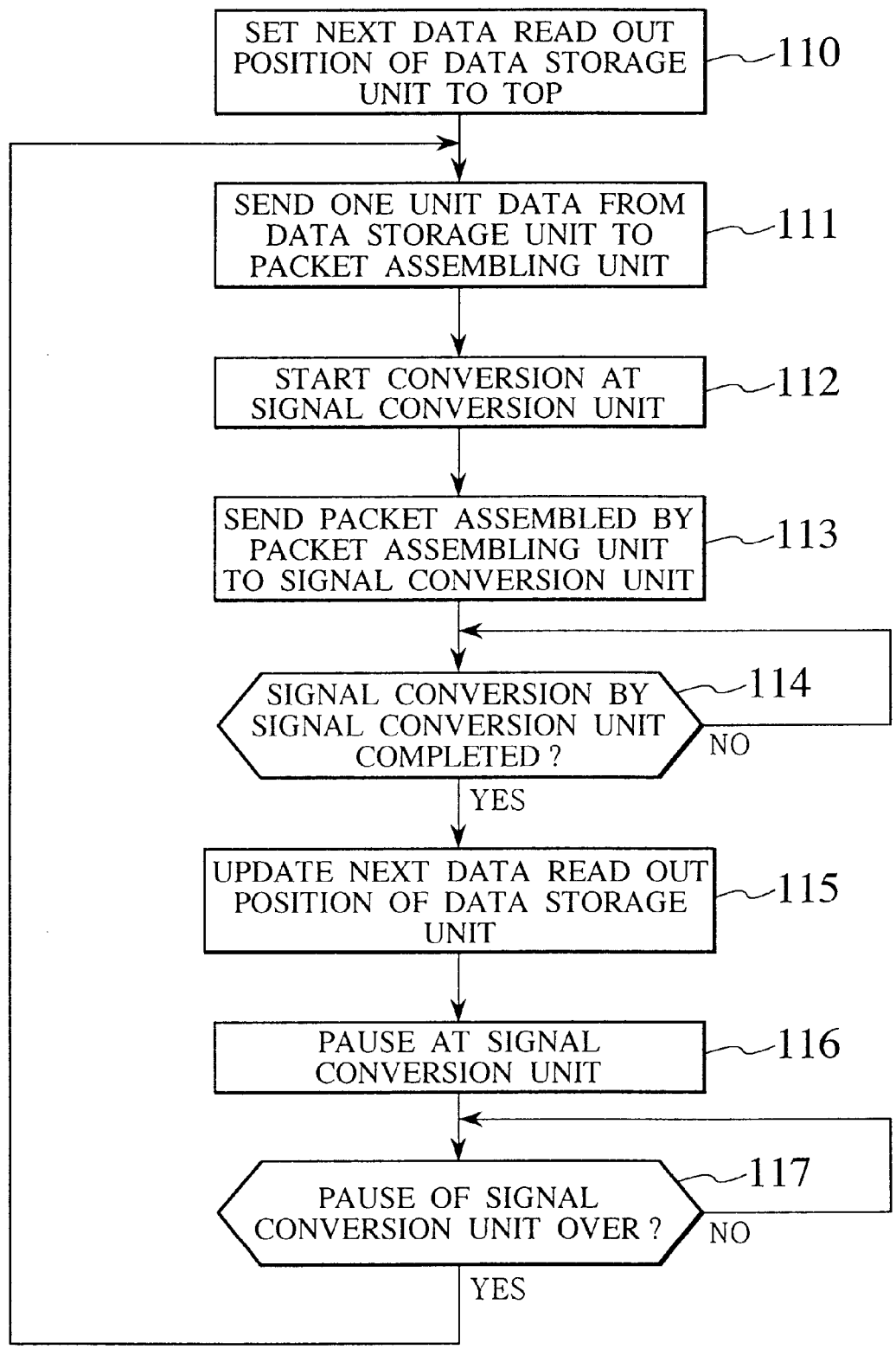
FIG. 4 is a flow chart for the operation of a data transmission device according to the second embodiment of the present invention.

FIG. 4 shows a flow chart for the operation of the data transmission device 20 of FIG. 3, which is carried out as follows.

Here, it is assumed that the data to be transmitted by the data transmission device 20 are stored in the data storage unit 21 in advance. As for the data storing into the data storage unit 21, data can be supplied through a communication channel from external, or through a recording medium such as magnetic disk, FD, ROM, etc., but this is not essential to the present invention so that it will not be described in detail here.

First, the control unit 23 sets a next data read out position which is a position of data to be signal converted next, to the top of the data stored in the data storage unit 21 (step 110). Then, the data of one unit part to be signal converted and outputted is read out from the next data read out position of the data storage unit 21, and sent to the packet generation unit 24 (step 111). Here, one unit part can be determined as 10 kbytes, for example, in view of a transmission rate and a required time until a reception start at a time of the data reception.

The packet generation unit 24 then generates one or more packets from the supplied data. Here, each packet may comprise the data to be transmitted (data content), an information (data part position information) for indicating a corresponding position in the entire data of this data (data part), an information (size information) for indicating a size of this packet, and error detection codes, for example.

The control unit 23 then commands the start of the signal conversion to the signal conversion unit 22 (step 112), and sends the packets to be signal converted and outputted from the packet generation unit 24 to the signal conversion unit 22 (step 113). In response, the signal conversion unit 22 generates signals from the supplied packets and outputs the generated signals.

The control unit 23 next confirms that the conversion and output of the packets sent at the step 113 is completed at the signal conversion unit 22 (step 114), and then updates the next data read out position in the data storage unit 21 (step 115). Here, this updating can be realized by setting the next data read out position ahead as much as a part of the signal converted data. When the last data are converted and outputted, the next data read out position is set back to the top.

Then, the control unit 23 commands a pause to the signal conversion unit 22, and in response to this pause command, the signal conversion unit 22 carries out a pause operation (step 116).

The control unit 23 next confirms the pause of the signal conversion unit 22 over a prescribed period of time (step 117), and then the operation returns to the step 111 to repeat the above described series of operations for a next one unit part of the data from the next data read out position, so as to realize the repetitive transmission of the entire data.

Here, the signal conversion and the pause can be realized similarly as in the first embodiment described above.

<Third Embodiment>

Figure 5:
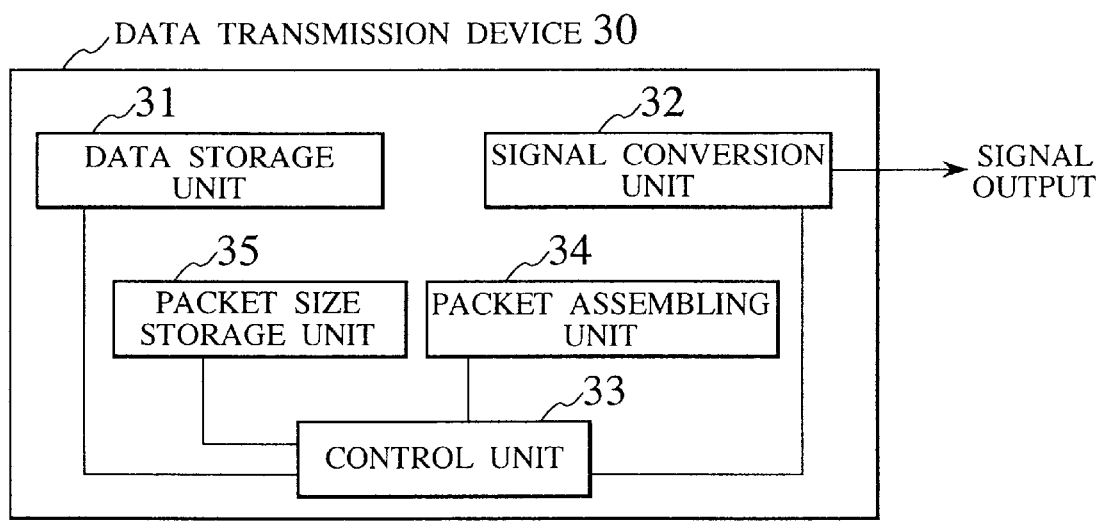
FIG. 5 is a block diagram of a data transmission device according to the third embodiment of the present invention.

FIG. 5 shows a configuration of a data transmission device according to the third embodiment of the present invention. This data transmission device 30 of FIG. 5 has a configuration in which a packet size storage unit 35 is added to the configuration of FIG. 3 of the above described second embodiment.

This packet size storage unit 35 is a unit for storing a size of a packet to be generated at a time of generating packets from each data part to be transmitted, which can be realized by a device such as semiconductor memory, magnetic memory, magnetic tape, etc., or a combination of such devices in which digital data can be stored and from which digital data can be outputted according to an external control.

The other elements 31, 32, 33 and 34 of FIG. 5 are substantially the same as the elements 21, 22, 23 and 24 of FIG. 3.

Figure 6:
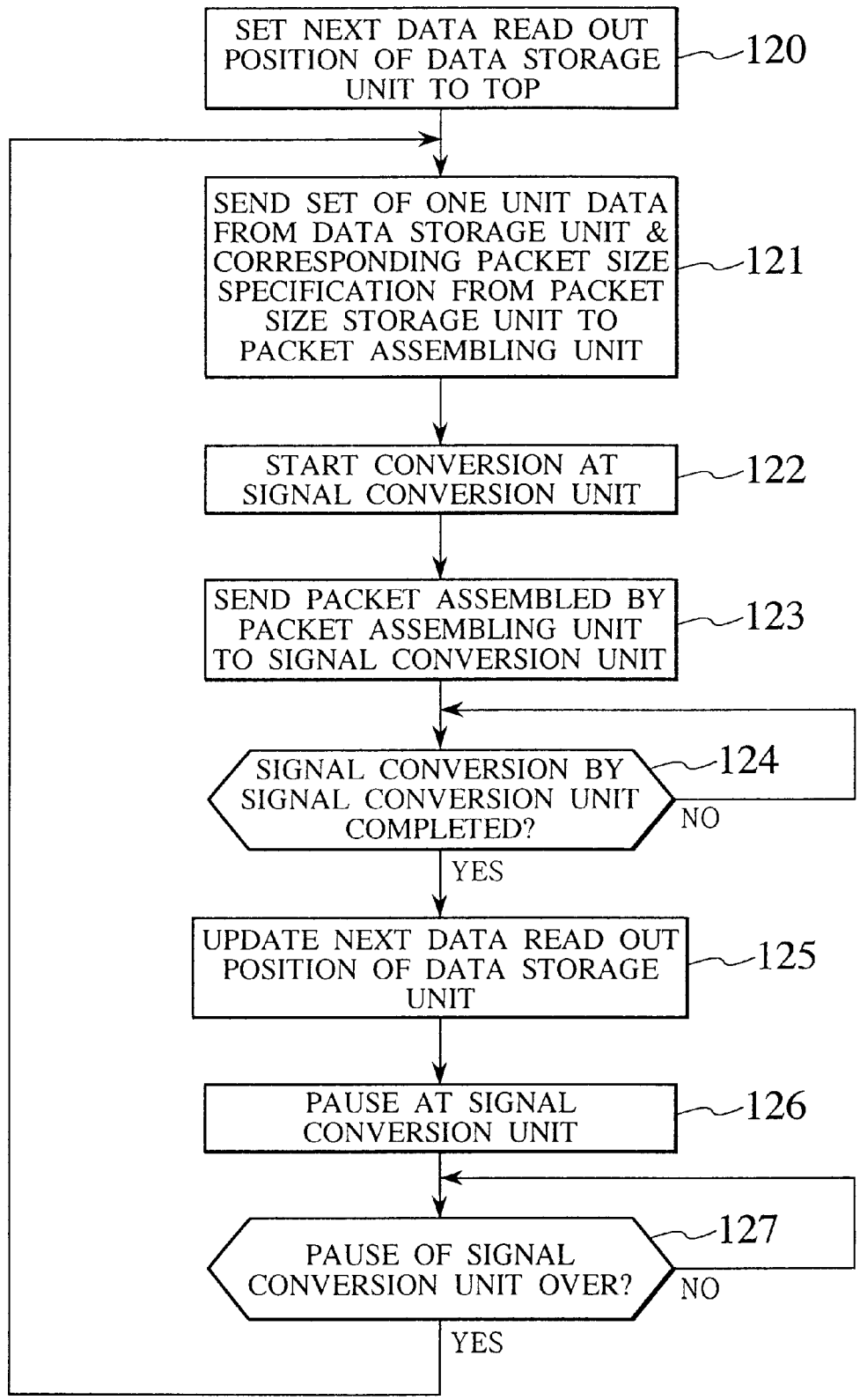
FIG. 6 is a flow chart for the operation of a data transmission device according to the third embodiment of the present invention.

FIG. 6 shows a flow chart for the operation of the data transmission device 30 of FIG. 5, which is carried out as follows.

Here, it is assumed that the data to be transmitted by the data transmission device 30 are stored in the data storage unit 31 in advance, and that the packet size specified for each data part is stored in the packet size storage unit 35 in advance.

First, the control unit 33 sets a next data read out position which is a position of data to be signal converted next, to the top of the data stored in the data storage unit 31 (step 120). Then, the data of one unit part to be signal converted and outputted is read out from the next data read out position of the data storage unit 31, while the specified packet size of a packet to be generated from this data part is read out from the packet size storage unit 35, and a set of these read out data and packet size are sent to the packet generation unit 34 (step 121).

The packet generation unit 34 then generates one or more packets from the supplied data according to the specified packet size. Here, the generated packets can have different sizes for different data parts according to the specified packet sizes. The packet size can be specified by a set of a position from the top of the data that specifies a data part and a desired packet size. Also, in a case where the data to be transmitted are data having structures such as files, it is also possible to specify a structure of the data part at a time of specifying the data part.

The control unit 33 then commands the start of the signal conversion to the signal conversion unit 32 (step 122), and sends the packets to be signal converted and outputted from the packet generation unit 34 to the signal conversion unit 32 (step 123). In response, the signal conversion unit 32 generates signals from the supplied packets and outputs the generated signals.

The control unit 33 next confirms that the conversion and output of the packets sent at the step 123 is completed at the signal conversion unit 32 (step 124), and then updates the next data read out position in the data storage unit 31 (step 125). Here, this updating can be realized by setting the next data read out position ahead as much as a part of the signal converted data. When the last data are converted and outputted, the next data read out position is set back to the top.

Then, the control unit 33 commands a pause to the signal conversion unit 32, and in response to this pause command, the signal conversion unit 32 carries out a pause operation (step 126).

The control unit 33 next confirms the pause of the signal conversion unit 32 over a prescribed period of time (step 127), and then the operation returns to the step 121 to repeat the above described series of operations for a next one unit part of the data from the next data read out position, so as to realize the repetitive transmission of the entire data.

Here, the signal conversion and the pause can be realized similarly as in the first embodiment described above.

<Fourth Embodiment>

Figure 7:
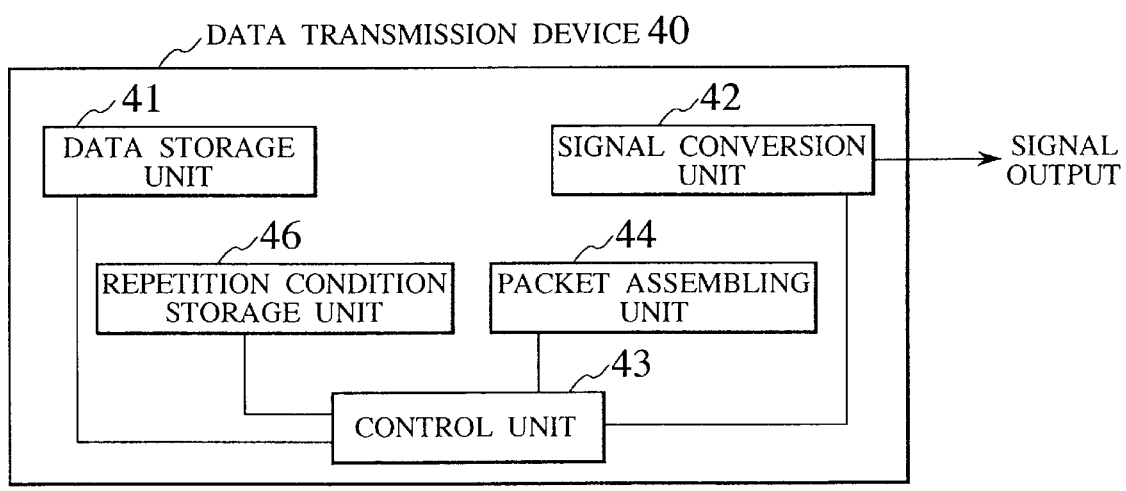
FIG. 7 is a block diagram of a data transmission device according to the fourth embodiment of the present invention.

FIG. 7 shows a configuration of a data transmission device according to the fourth embodiment of the present invention. This data transmission device 40 of FIG. 7 has a configuration in which a repetition condition storage unit 46 is added to the configuration of FIG. 3 of the above described second embodiment. Here, the elements 42, 43 and 44 of FIG. 7 are substantially the same as the elements 22, 23 and 24 of FIG. 3, but the data storage unit 41 differs from that of FIG. 3 in that it should be provided in a form of a randomly accessible device such as semiconductor memory, magnetic disk, etc.

The newly added repetition condition storage unit 46 is a unit for storing a condition on the repetitive transmission for each data part to be transmitted, which can be realized by a device such as semiconductor memory, magnetic disk, etc., in which digital data can be stored and from which digital data can be outputted according to an external control.

Figure 8:
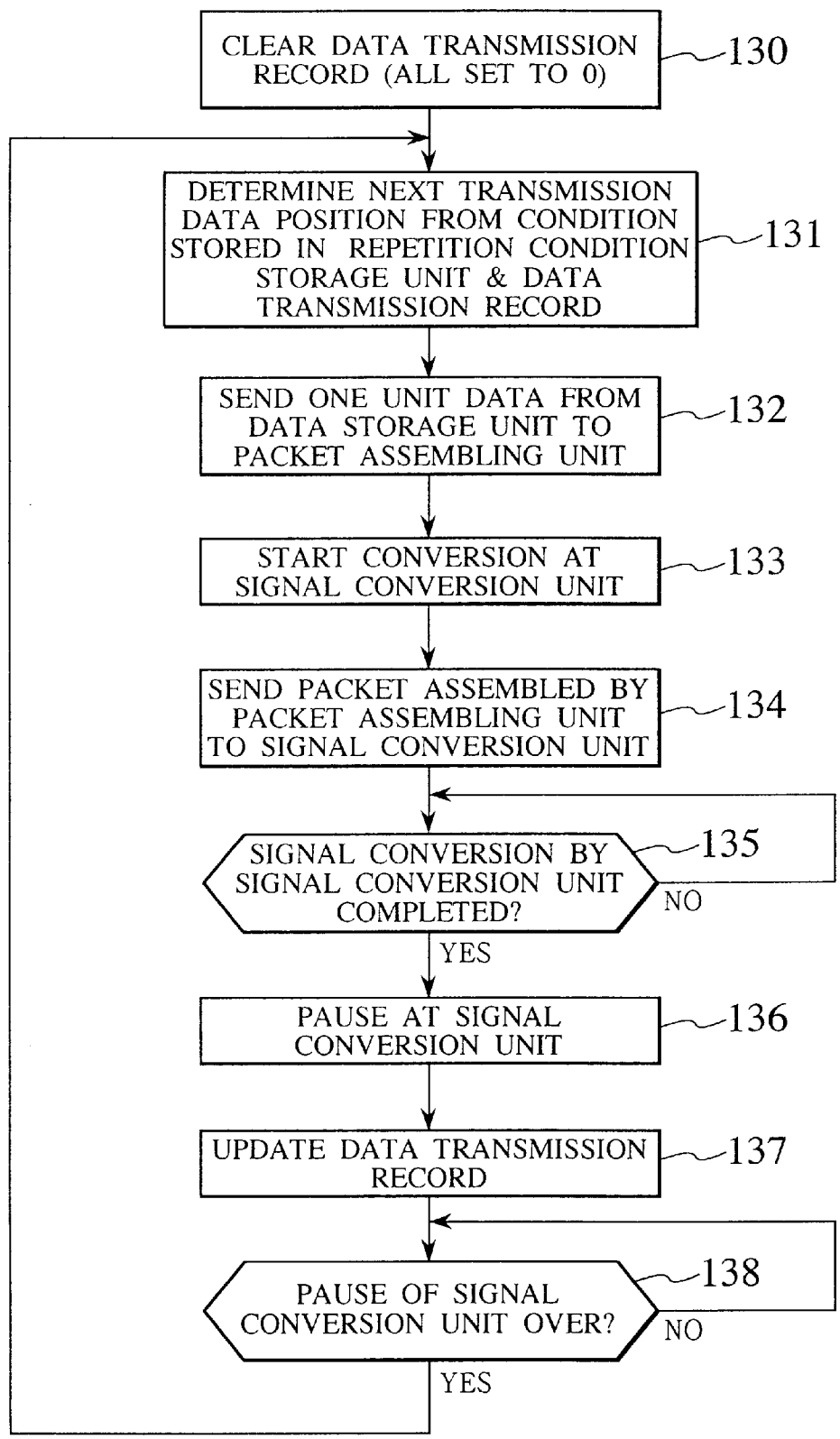
FIG. 8 is a flow chart for the operation of a data transmission device according to the fourth embodiment of the present invention.

FIG. 8 shows a flow chart for the operation of the data transmission device 40 of FIG. 7, which is carried out as follows.

Here, it is assumed that the data to be transmitted by the data transmission device 40 are stored in the data storage unit 41 in advance, and that the repetition condition specified for each data part is stored in the repetition condition storage unit 46 in advance. Here, the repetition condition can be specified by a set of a position from the top of the data that specifies a data part and a weight on a number of times for transmitting this data part. Namely, in a case of transmitting 100 kbytes transmission data from the top, with the 20 kbyte-th data to be transmitted at a frequency twice as high as the rest, the repetition condition can be specified as "(top, 1), (20 kbyte-th, 2)", for example.

First, the control unit 43 clears data transmission records for the entire data (that is, all the data transmission records are set to z0) (step 130). Next, the control unit 43 determines the data of one unit part to be signal converted and outputted according to the repetition condition stored in the repetition condition storage unit 46 and the data transmission records (step 131). For example, when the data transmission record for each data part is given by a number of times for which this data part has been transmitted and the repetition condition for each data part is given by a weight on a number of times for transmitting this data part repeatedly, one unit part data is selected sequentially in an increasing order of a product of the number of times for which each data part has been transmitted and the weight on the number of times for transmitting each data part.

The control unit 43 then sends this one unit part data to the packet generation unit 44 (step 132), commands the start of the signal conversion to the signal conversion unit 42 (step 133), and sends the packets to be signal converted and outputted from the packet generation unit 44 to the signal conversion unit 42 (step 134). In response, the signal conversion unit 42 generates signals from the supplied packets and outputs the generated signals sequentially.

The control unit 43 next confirms that the conversion and output of the packets sent at the step 134 is completed at the signal conversion unit 42 (step 135), and then commands a pause to the signal conversion unit 42 (step 136), and updates the data transmission record for the transmitted data part (step 137). In response to this pause command, the signal conversion unit 42 carries out a pause operation (step 138).

The control unit 43 next confirms the pause of the signal conversion unit 42 over a prescribed period of time (step 138), and then the operation returns to the step 131 to repeat the above described series of operations by determining a next one unit part of the data to be transmitted. In this manner, it is possible to realize the data transmission in which different data parts can be transmitted at different frequencies.

Here, the signal conversion and the pause can be realized similarly as in the first embodiment described above.

Note that there are cases in which the effective repetitive transmission can be realized by specifying a condition on a transmission interval as the repetition condition, in addition to a condition regarding a difference in the transmission frequencies. For example, it is useful to adopt a scheme for selecting a next data to be transmitted in an increasing order of the allowed grace period, which can be given by a value obtained by subtracting the current time from a sum of the latest transmission time recorded in the data transmission record and the transmission interval specified as the repetition condition.

<Fifth Embodiment>

Figure 9:
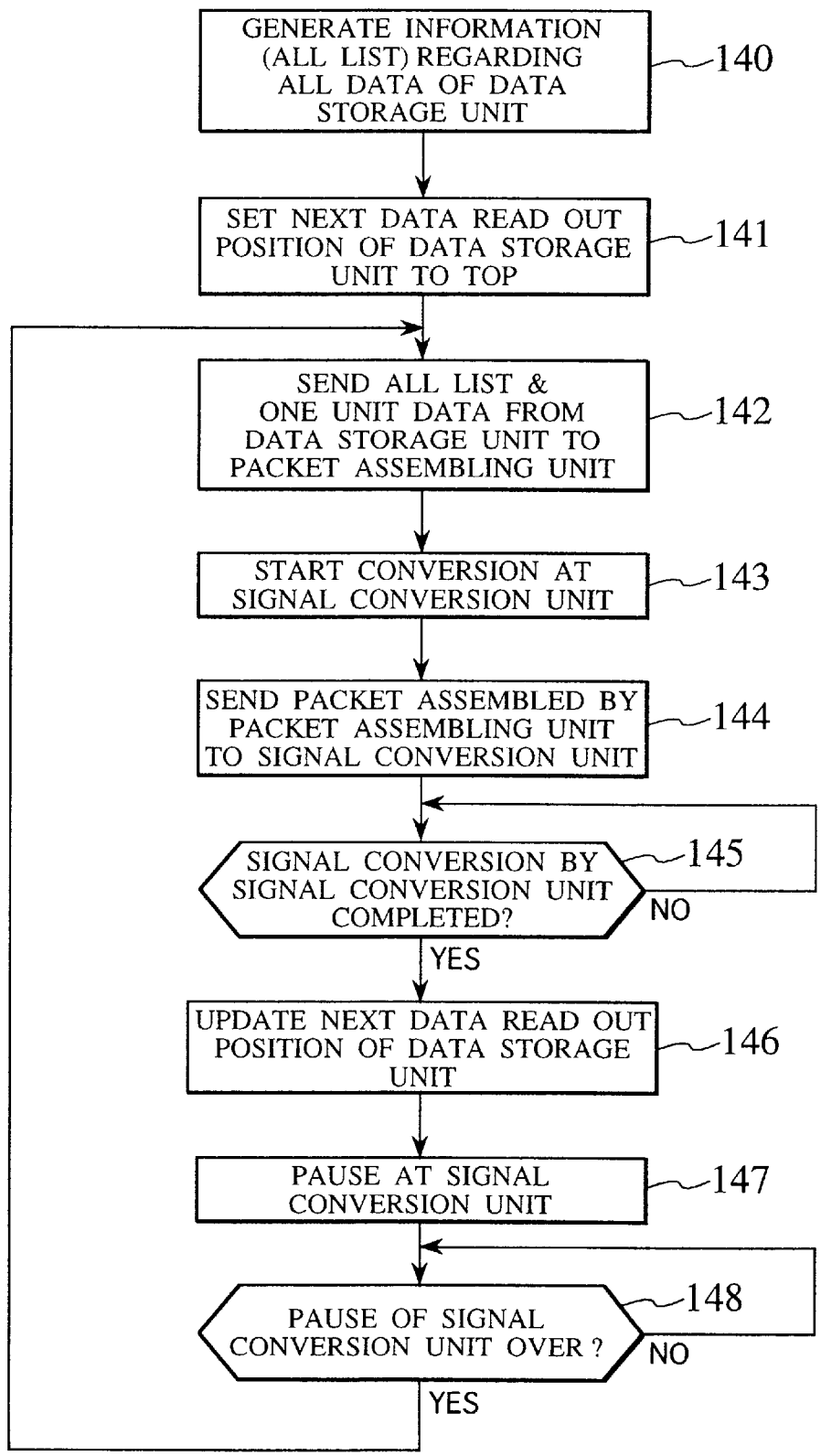
FIG. 9 is a flow chart for the operation of a data transmission device according to the fifth embodiment of the present invention.

FIG. 9 shows a flow chart for the operation of the data transmission device according to the fifth embodiment of the present invention. In this fifth embodiment, the data transmission device has substantially the same configuration as the data transmission device 20 of FIG. 3, and it is assumed that the data to be transmitted are stored in the data storage unit 21 in advance First, the control unit 23 generates an information (all list) regarding all the data to be transmitted which are stored in the data storage unit 21 (step 140), and sets a next data read out position which is a position of data to be signal converted next, to the top of the data stored in the data storage unit 21 (step 141). Here, the all list can be realized by indicating a total size of all the data to be transmitted, for example. This all list can be anything by which the reception of all the data can be checked upon matching it with the received packets, and can be also realized by indicating a total number of transmitted packets or a valid range of the serial numbers of the transmitted packets, for example.

Then, at the control unit 23, the data of one unit part to be signal converted and outputted is read out from the next data read out position of the data storage unit 21, and sent to the packet generation unit 24 along with the all list (step 142).

The packet generation unit 24 then generates one or more packets from the supplied data and all list. Here, each packet may comprise the data to be transmitted (data content), an information (data part position information) for indicating a corresponding position in the entire data of this data (data part), an information (size information) for indicating a size of this packet, and error detection codes, for example. As for the all list, one packet may be formed for the all list, or the all list may be attached to each packet.

The control unit 23 then commands the start of the signal conversion to the signal conversion unit 22 (step 143), and sends the packets to be signal converted and outputted from the packet generation unit 24 to the signal conversion unit 22 (step 144). In response, the signal conversion unit 22 generates signals from the supplied packets and outputs the generated signals.

The control unit 23 next confirms that the conversion and output of the packets sent at the step 144 is completed at the signal conversion unit 22 (step 145), and then updates the next data read out position in the data storage unit 21 (step 146). Here, this updating can be realized by setting the next data read out position ahead as much as a part of the signal converted data. When the last data are converted and outputted, the next data read out position is set back to the top.

Then, the control unit 23 commands a pause to the signal conversion unit 22, and in response to this pause command, the signal conversion unit 22 carries out a pause operation (step 147).

The control unit 23 next confirms the pause of the signal conversion unit 22 over a prescribed period of time (step 148), and then the operation returns to the step 142 to repeat the above described series of operations for a next one unit part of the data from the next data read out position, so as to realize the repetitive transmission of the entire data.

Here, the signal conversion and the pause can be realized similarly as in the first embodiment described above.

In this fifth embodiment, an exemplary case of transmitting the all list at every occasion of the data transmission has been described, but it is also possible to transmit the all list only once in every several occasions of the data transmission, or at a prescribed time interval, or else only once for one round of the data transmission of the entire data.

<Sixth Embodiment>

Figure 10:
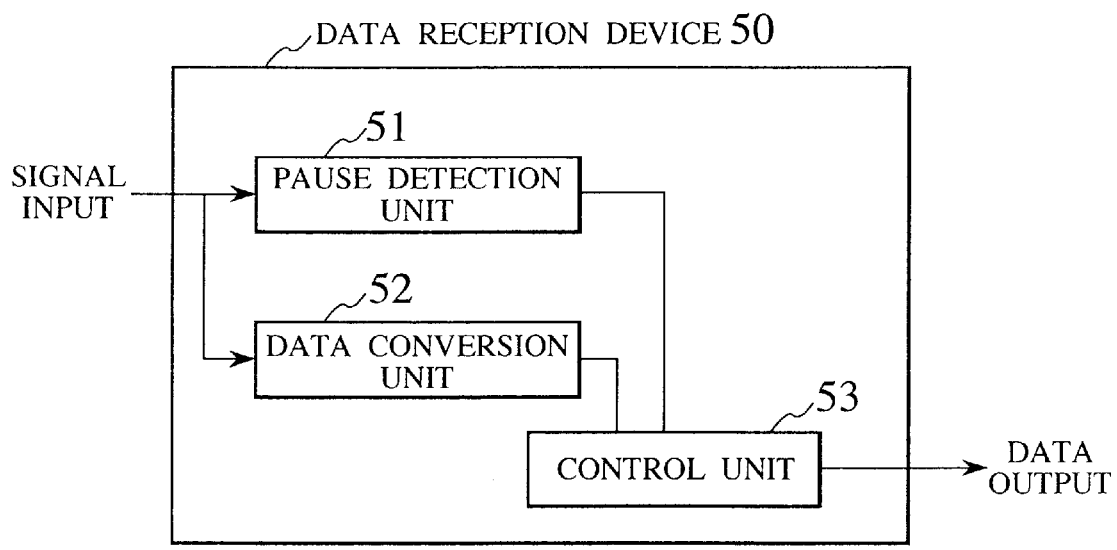
FIG. 10 is a block diagram of a data reception device according to the sixth embodiment of the present invention.

FIG. 10 shows a configuration of a data reception device according to the sixth embodiment of the present invention. This data reception device 50 of FIG. 10 comprises a pause detection unit 51, a data conversion unit 52, and a control unit 53.

The pause detection unit 51 is a unit for detecting the transmission pause state in the entered signals. Here, the pause state can be detected by a suitable signal detection circuit according to a scheme predetermined between the data transmission device and the data reception device, in a form of a silent section in the analog telephone bandwidth, or in a form of a prescribed signal level or data bit sequence, for example. It is also possible to detect the pause state by a combination of a general purpose signal processing circuit and a microcomputer.

The data conversion unit 52 is a unit for reproducing the data from input signals, which can be realized by a suitable circuit depending on a type of input signals, such as a demodulation circuit for the analog telephone in a case of inputting modulated data signals in the analog telephone bandwidth, for example.

The control circuit 53 is a unit for controlling the data reception by the data reception device 50, which can be realized by a micro-computer, for example.

Figure 11:
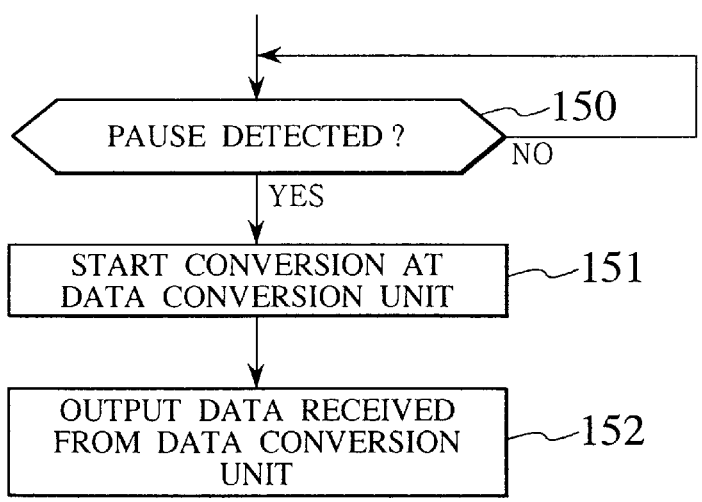
FIG. 11 is a flow chart for the operation of a data reception device according to the sixth embodiment of the present invention.

FIG. 11 shows a flow chart for the operation of the data reception device 50 of FIG. 10, which is carried out as follows.

First, the control unit 53 awaits for the detection of the pause by the pause detection unit 51 (step 150). At the pause detection unit 51, the input signals are observed and the pause state is detected.

When the pause state is detected, the control unit 53 commands the data conversion to the data conversion unit 52 by taking the detected pause as the reception timing. In response, the data conversion unit 52 executes the data conversion suitable for the input signals (step 151). For example, when the input signals are the ITU-V.17 modulated signals in the analog telephone bandwidth, the demodulation suitable for these signals is carried out and the data are reproduced. The control unit 53 then receives the data reproduced by the data conversion unit 52 and sequentially outputs them (step 152).

Note that the input signals can be analog signals according to the other modulation scheme or digital signals, and it suffices to use the pause detection unit and the data conversion unit which are in forms suitable for the input signals used.

<Seventh Embodiment>

Figure 12:
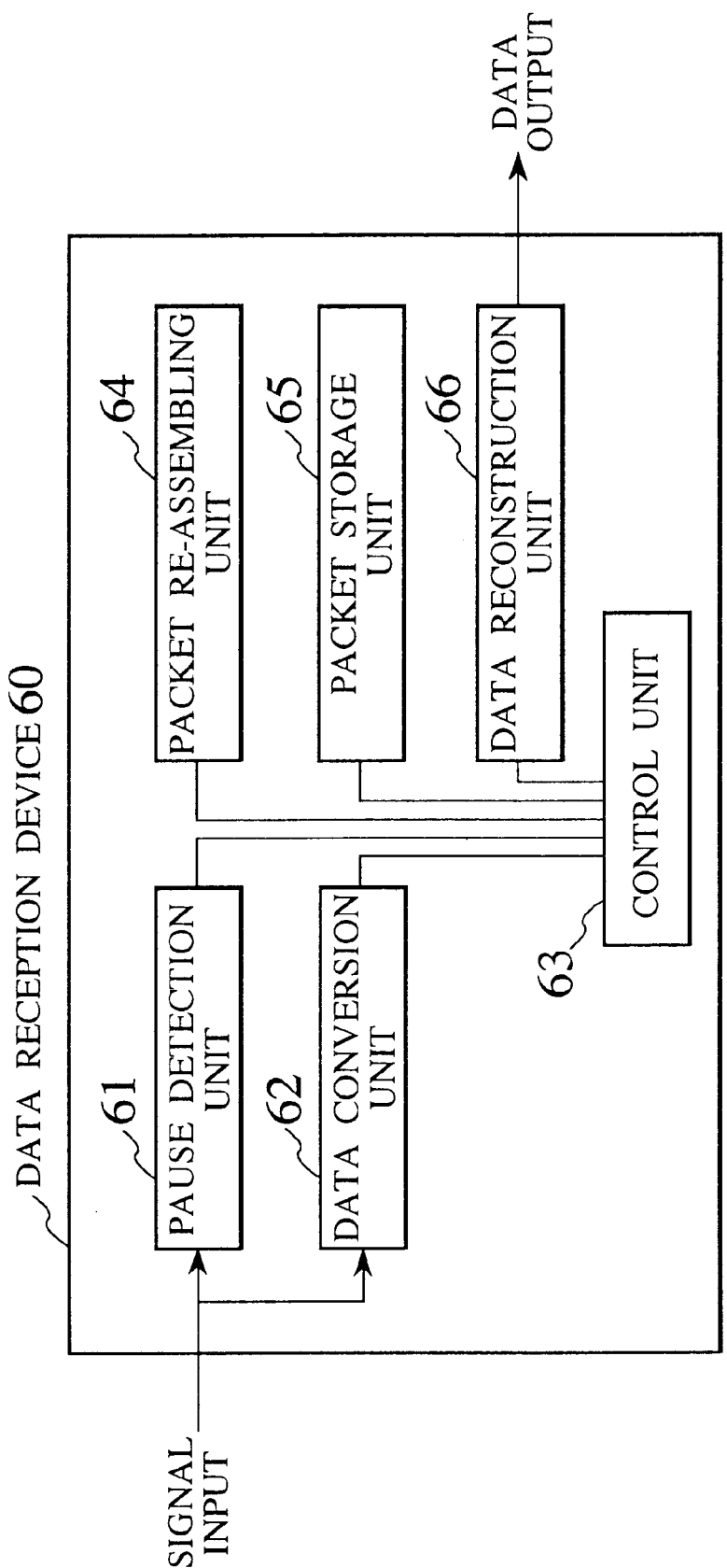
FIG. 12 is a block diagram of a data reception device according to the seventh embodiment of the present invention.

FIG. 12 shows a configuration of a data reception device according to the seventh embodiment of the present invention. This data reception device 60 of FIG. 12 comprises a pause detection unit 61, a data conversion unit 62, a control unit 63, a packet re-assembling unit 64, a packet storage unit 65, and a data reconstruction unit 66.

The pause detection unit 61 is a unit for detecting the transmission pause state in the entered signals. Here, the pause state can be detected by a suitable signal detection circuit according to a scheme predetermined between the data transmission device and the data reception device, in a form of a silent section in the analog telephone bandwidth, or in a form of a prescribed signal level or data bit sequence, for example. It is also possible to detect the pause state by a combination of a general purpose signal processing circuit and a microcomputer.

The data conversion unit 62 is a unit for reproducing the data from input signals, which can be realized by a suitable circuit depending on a type of input signals, such as a demodulation circuit for the analog telephone in a case of inputting modulated data signals in the analog telephone bandwidth, for example.

The control circuit 63 is a unit for controlling the data reception by the data reception device 60, which can be realized by a micro-computer, for example.

The packet re-assembling unit 64 is a unit for re-assembling packets from the data, which can be realized by a micro-computer, for example.

The packet storage unit 65 is a unit for temporarily storing the re-assembled packets, which can be realized by a randomly accessible and read/write possible device such as semiconductor memory, magnetic disk, etc.

The data reconstruction unit 66 is a unit for reconstructing the received data from one or more packets, which can be realized by a micro-computer, for example.

Note that it is not absolutely necessary to realize the control unit 63, the packet re-assembling unit 64 and the data reconstruction unit 66 in forms of separate microcomputers, and it is also possible to realize them together by a single micro-computer.

Figure 13:
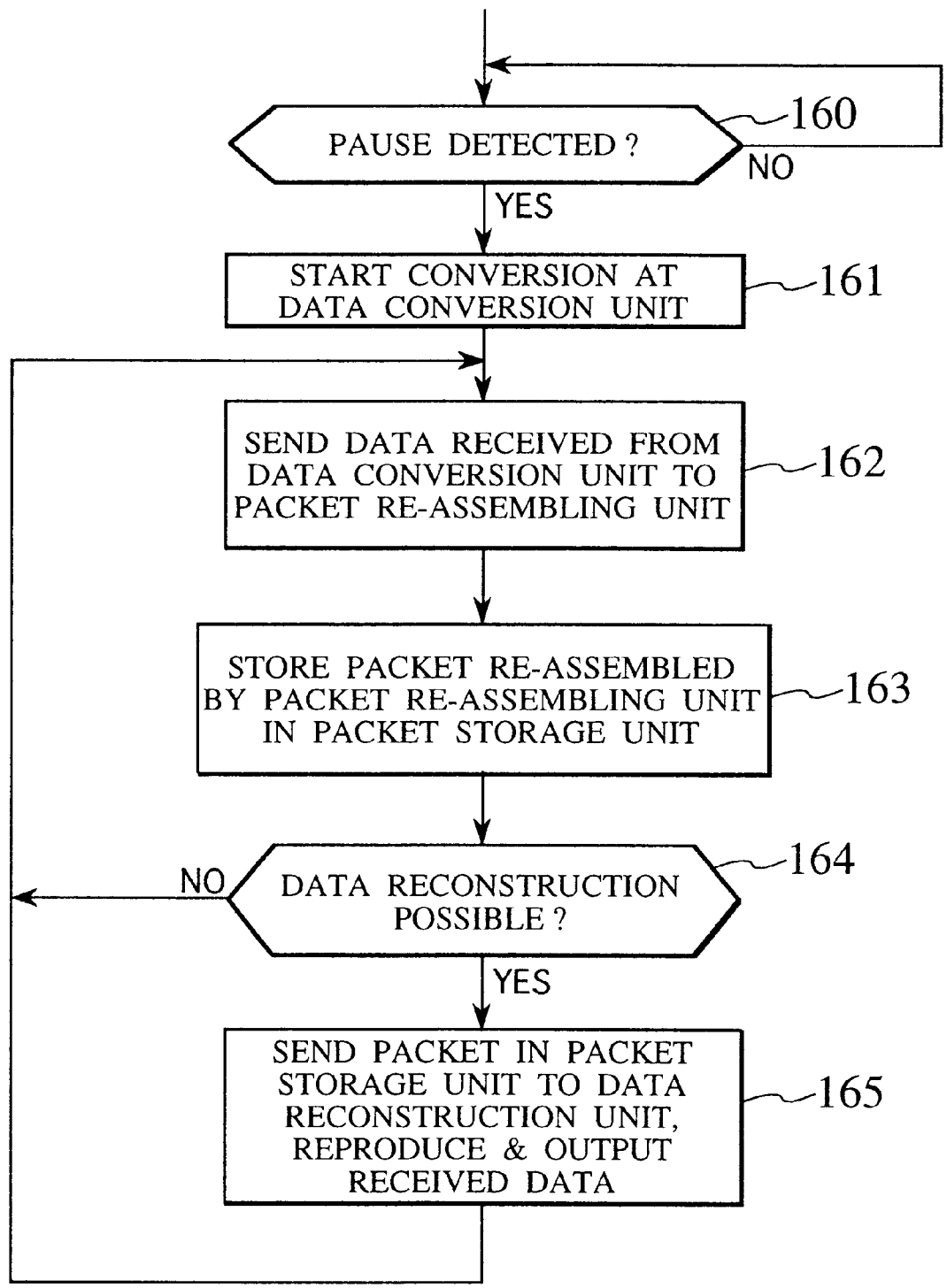
FIG. 13 is a flow chart for the operation of a data reception device according to the seventh embodiment of the present invention.

FIG. 13 shows a flow chart for the operation of the data reception device 60 of FIG. 12, which is carried out as follows.

First, the control unit 63 awaits for the detection of the pause by the pause detection unit 61 (step 160). At the pause detection unit 61, the input signals are observed and the pause state is detected.

When the pause state is detected, the control unit 63 commands the data conversion to the data conversion unit 62 by taking the detected pause as the reception timing. In response, the data conversion unit 62 executes the data conversion suitable for the input signals (step 161).

Then, the control unit 63 sequentially sends the data reproduced by the data conversion unit 62 to the packet re-assembling unit 64 (step 162), and the packet re-assembling unit 64 re-assembles correct packets from the supplied data. Then, the control unit 63 stores only those reassembled packets which are not yet stored in the packet storage unit 65, into the packet storage unit 65 (step 163).

Then, the control unit 63 Judges whether a sufficient amount of packets capable of reconstructing the received data are stored in the data storage unit 65 or not (step 164). When packets sufficient for data reconstruction are not yet stored, the operation returns to the step 162, whereas when packets sufficient for data reconstruction are stored, these packets are sent to the data reconstruction unit 66, and the data reconstruction unit 66 reconstructs data by using these packets sequentially from the top packet, and outputs the reconstructed data as the received data (step 165).

Here, the judgement as to whether packets are sufficient for the data reconstruction or not can be made, for example, by verifying that packets corresponding to the still not outputted data part exist and that all packets corresponding to a portion between the top and that data part exist.

Thereafter, the data sending from the data conversion unit 62 to the packet re-assembling unit 64 (step 162) and the subsequent operations are repeated so as to realize the data reception.

Here, the pause state detection and the data conversion can be realized similarly as in the sixth embodiment described above.

<Eighth Embodiment>

Figure 14:
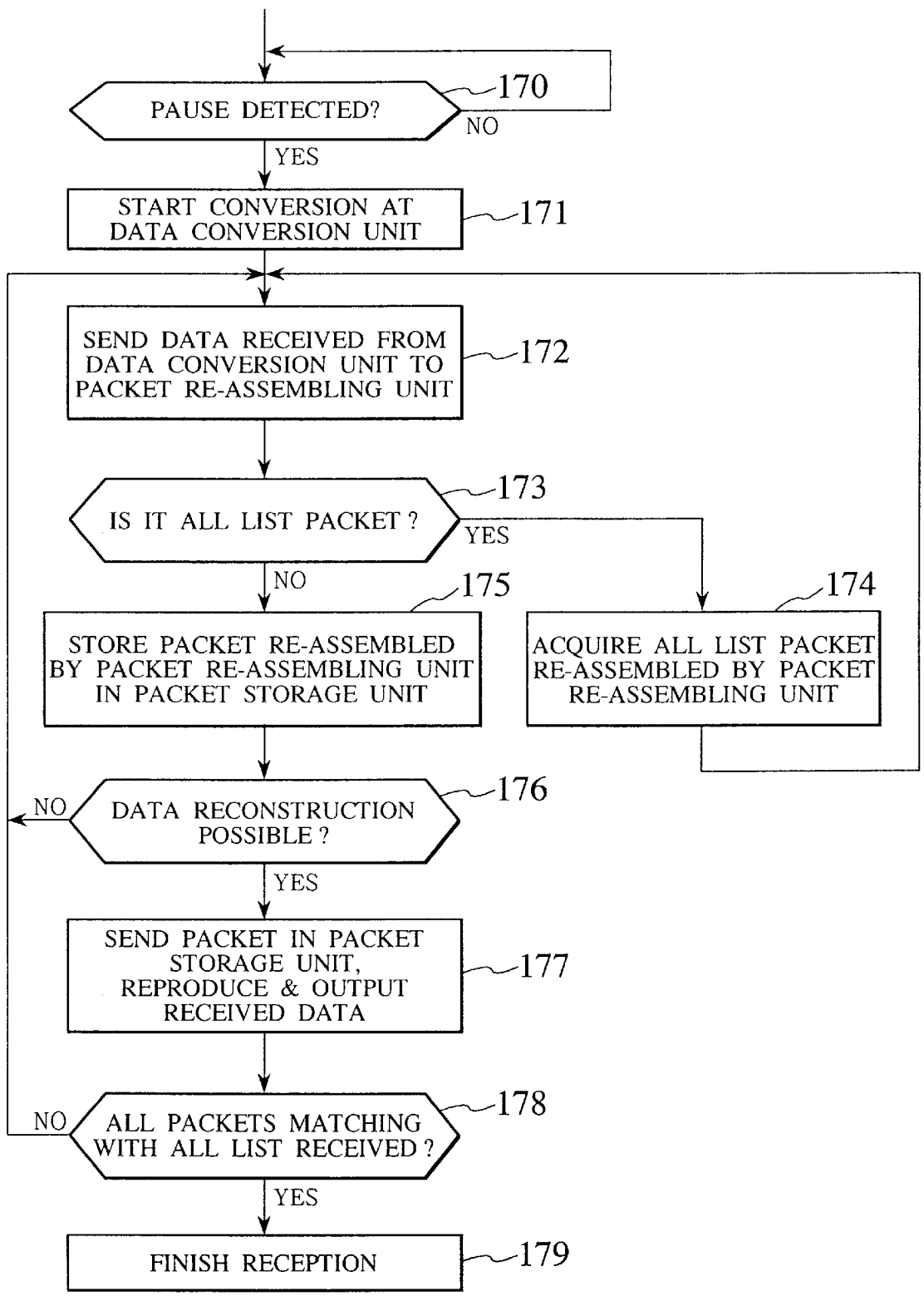
FIG. 14 is a flow chart for the operation of a data reception device according to the eighth embodiment of the present invention.

FIG. 14 shows a flow chart for the operation of the data reception device according to the eighth embodiment of the present invention. In this eighth embodiment, the data reception device has substantially the same configuration as the data reception device 60 of FIG. 12.

First, the control unit 63 awaits for the detection of the pause by the pause detection unit 61 (step 170). At the pause detection unit 61, the input signals are observed and the pause state is detected.

When the pause state is detected, the control unit 63 commands the data conversion to the data conversion unit 62 by taking the detected pause as the reception timing. In response, the data conversion unit 62 executes the data conversion suitable for the input signals (step 171).

Then, the control unit 63 sequentially sends the data reproduced by the data conversion unit 62 to the packet re-assembling unit 64 (step 172), and the packet re-assembling unit 64 re-assembles correct packets from the supplied data. The operation up to this point is the same as that of FIG. 13.

Next, when the re-assembled packet is the all list packet (step 173 YES), the control unit 63 acquires and stores this all list packet (step 174), and the operation returns to the step 172 to execute the processing of a next data reproduced by the data conversion unit 62. Here, the all list packet is a special packet transmitted from the transmitting side, which can be anything by which the reception of all the data can be checked upon matching it with the received packets, and which indicates a total size of the entire transmitted data, a total number of transmitted packets, or a valid range of the serial numbers of the transmitted packets, etc., for example.

As for the re-assembled packets other than the all list packet, the control unit 63 stores only those re-assembled packets which are not yet stored in the packet storage unit 65, into the packet storage unit 65 (step 175).

Then, when the control unit 63 judges that a sufficient amount of packets capable of reconstructing the received data are stored in the data storage unit 65 (step 176 YES), these packets are sent to the data reconstruction unit 66, and the data reconstruction unit 66 reconstructs data by using these packets sequentially from the top packet, and outputs the reconstructed data as the received data, while makes records on the outputted data parts (step 177).

Here, the judgement as to whether packets stored in the packet storage unit 65 are sufficient for the data reconstruction or not at the step 176 can be made, for example, by verifying that packets corresponding to the still not outputted data part exist and that all packets corresponding to a portion between the top and that data part exist. Also, it suffices for the records on the outputted data parts to have a content indicating a portion in the entire data that corresponds to the received and outputted data part, and can be obtained by recording a set of a position from a top in the entire transmitted data and a size of the outputted data part, or a serial number of the received packet when a serial number is assigned to each packet.

In a case where the all list is already acquired, the control unit 63 matches the all list with the records of the so far received and outputted data, and if all the data in a range of the all list are already outputted (step 178 YES), the reception is finished (step S179).

Thereafter, the data sending from the data conversion unit 62 to the packet re-assembling unit 64 (step 172) and the subsequent operations are repeated until the reception is finished, so as to realize the reception of the entire data.

Here, the pause state detection and the data conversion can be realized similarly as in the sixth embodiment described above.

<Ninth Embodiment>

Figure 15:
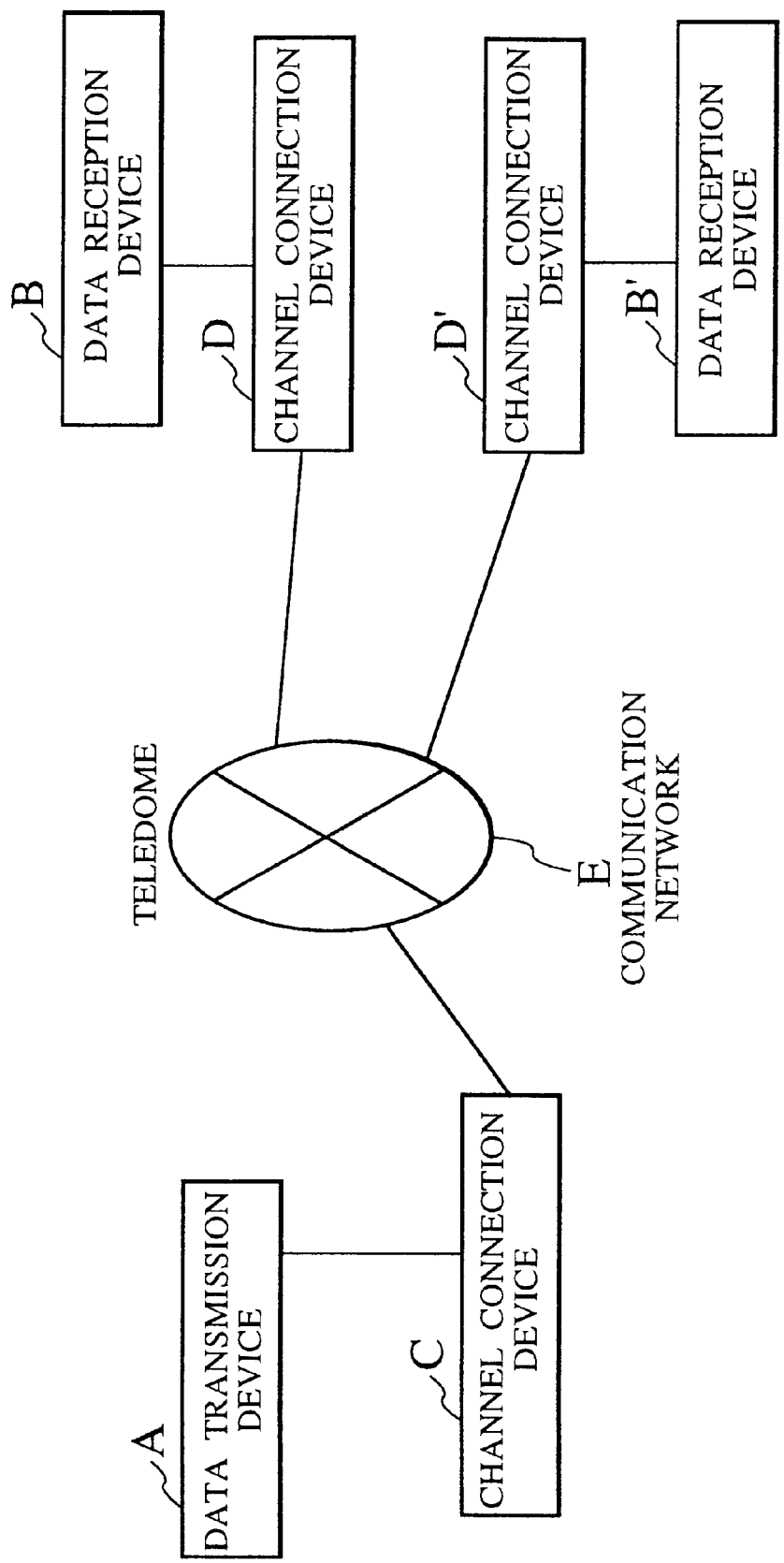
FIG. 15 is a block diagram showing a data transmission and reception system according to the ninth embodiment of the present invention.

FIG. 15 shows a configuration of a data transmission and reception system according to the ninth embodiment of the present invention. This ninth embodiment is directed to a case of realizing the data delivery from one data transmission device to a plurality (only two are shown in FIG. 15) of data reception devices.

In FIG. 15, the transmitting side comprises a data transmission device A and a channel connection device C, while the receiving side comprises a data reception device B and a channel connection device D as well as a data reception device B' and a channel connection device D', and a signal distribution function is realized by utilizing a distribution service called teledome which is provided by a communication network E. Here, the teledome is a service by which a contractor can provide information with respect to a large number of simultaneously occurring calls without using a busy state by merely installing a single sound source channel. This is a service that has been commercially offered by the NTT corporation in Japan since Nov. 12, 1993, which is currently available nationwide in Japan and expected to be widely spread in future. In FIG. 15, the data transmission device A outputs the modulated signals in the analog speech bandwidth, and the data reception devices B and B' are equipped with signal conversion units for demodulating these modulated signals into data.

In this configuration of FIG. 15, the data transmission and reception is realized as follows.

At the transmitting side, the data transmission device A is constantly outputting signals. When there is a reception request from the data reception device B of the receiving side, a procedure for channel connection up to the transmitting side is executed by the channel connection device D with respect to the communication network E, and the communication network E notifies the call termination to the channel connection device C of the transmitting side according to the prescribed procedure.

Upon receiving the notice for the call termination, the channel connection device C of the transmitting side executes the call termination connection procedure so as to set up a channel connection with the receiving side, and transmits the signals from the data transmission device A to the receiving side through that channel. After the channel connection set up, at the receiving side, the signals from the transmitting side are sent to the data reception device B through the channel connection device D so as to realize the data reception.

In this embodiment, the teledome service described above is utilized in realizing the signal distribution function, so that even when the channel connection device D of the receiving side has set up a channel connection with the transmitting side, it is possible for another channel connection device D' to set up the channel connection with the same transmitting side. Namely, it is possible to set up the channel connections for a plurality of receiving sides with respect to the channel connection device C simultaneously, so that it is possible for a plurality of receiving sides to receive the data simultaneously.

Note that, in this embodiment, an exemplary case of utilizing the teledome service in realizing the signal distribution function has been described, but any other available means can be utilized instead as long as a uni-directional signal distribution is possible. For example, it is also possible to utilize the off-talk communication service (a service for uni-directional transmission (broadcast) of analog information such as speech and music to subscribers from an information providing center installed by the self-governing community and the like through exchangers at branches and business offices of the service provider by utilizing idle time of the telephone lines), the CATV service, the terrestrial or satellite radio data broadcast, or the MBone (virtual Multicast Backbone On the interNEt) based on the multicast technique in the Internet.

<Tenth Embodiment>

Figure 16:
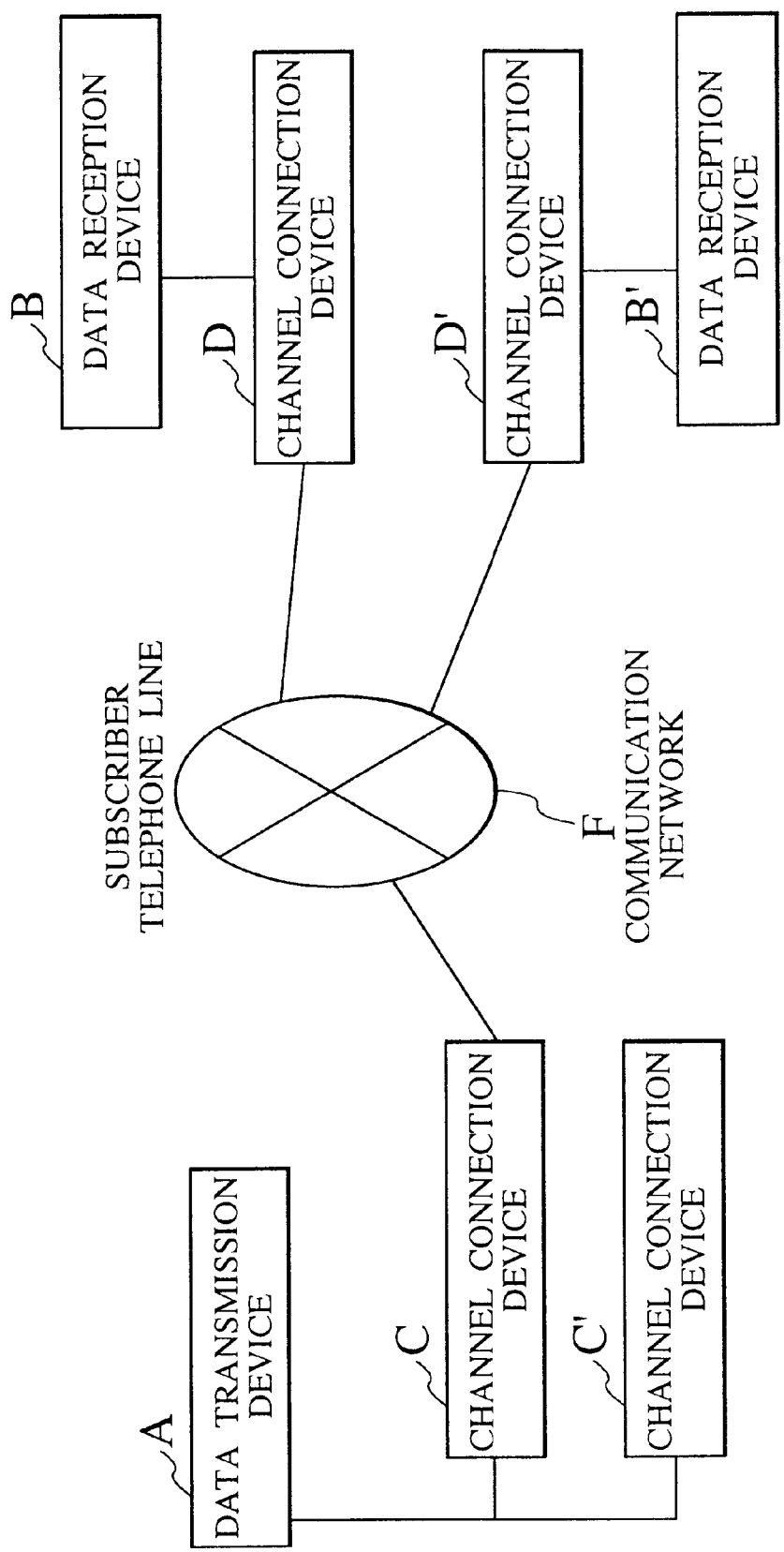
FIG. 16 is a block diagram showing a data transmission and reception system according to the tenth embodiment of the present invention.

FIG. 16 shows a configuration of a data transmission and reception system according to the tenth embodiment of the present invention. This tenth embodiment is also directed to a case of realizing the data delivery from one data transmission device to a plurality (only two are shown in FIG. 16) of data reception devices.

In FIG. 16, the transmitting side comprises a data transmission device A and a plurality of channel connection devices C and C', while the receiving side comprises a data reception device B and a channel connection device D as well as a data reception device B' and a channel connection device D'. A signal distribution is carried out at the transmitting side, and a communication network F of the public subscriber telephone is used for a signal transmission between the transmitting side and the receiving side. In FIG. 16, the data transmission device A outputs the modulated signals in the analog speech bandwidth, and the data reception devices B and B' are equipped with signal conversion units for demodulating these modulated signals into data.

In this configuration of FIG. 16, the data transmission and reception is realized as follows.

At the transmitting side, the data transmission device A is constantly outputting signals, and these signals are constantly supplied to a plurality of channel connection devices C and C'.

When there is a reception request from the receiving side, the data reception device B, for example, a procedure for channel connection up to the transmitting side is executed by the channel connection device D with respect to the communication network F, and the communication network F notifies the call termination to the channel connection device C of the transmitting side according to the prescribed procedure.

Upon receiving the notice for the call termination, the channel connection device C of the transmitting side executes the call termination connection procedure so as to set up a channel connection with the receiving side, and transmits the signals from the data transmission device A to the receiving side through that channel. After the channel connection set up, at the receiving side, the signals from the transmitting side are sent to the data reception device B through the channel connection device D so as to realize the data reception.

In this embodiment, a plurality of communication channels are used so that the signals generated at one and the same data transmission device A can be received by a plurality of data reception devices B and B' simultaneously. More specifically, while the channel connection device D of the data reception device B has set up a channel connection with the data transmission device A, it is possible for another channel connection device D' of another data reception device B' to set up the channel connection through another channel and another channel connection device C' of the data transmission device A.

Note that, besides the communication network of the public subscriber telephone used above, the signal transmission can also be realized by using any other means capable of transmitting the signals in the analog telephone bandwidth such as mobile communication network and PHS.

Note also that, in the configurations of FIG. 15 and FIG. 16, any suitable combination of the data transmission device and the data reception device (and their operation methods) as described in the above embodiments can be used as the data transmission device A and the data reception devices B and B', so that it is possible to realize the data transmission and reception of various kinds in correspondence to various device combinations.

More specifically, it is possible to consider the following combinations.

(1) The data transmission and reception method in which the signals transmitted from the data transmission device of FIG. 1 (using the data transmission method of FIG. 2) are distributed and delivered to a plurality of receiving sides, and received by a plurality of receiving sides each in a form of the data reception device of FIG. 10 (using the data reception method of FIG. 11).

(2) The data transmission and reception method in which the signals transmitted from the data transmission device of FIG. 3 (using the data transmission method of FIG. 4) are distributed and delivered to a plurality of receiving sides, and received by a plurality of receiving sides each in a form of the data reception device of FIG. 12 (using the data reception method of FIG. 13).

(3) The data transmission and reception method in which the signals transmitted from the data transmission device of FIG. 5 (using the data transmission method of FIG. 6) are distributed and delivered to a plurality of receiving sides, and received by a plurality of receiving sides each in a form of the data reception device of FIG. 12 (using the data reception method of FIG. 13).

(4) The data transmission and reception method in which the signals transmitted from the data transmission device of FIG. 7 (using the data transmission method of FIG. 8) are distributed and delivered to a plurality of receiving sides, and received by a plurality of receiving sides each in a form of the data reception device of FIG. 12 (using the data reception method of FIG. 13).

(5) The data transmission and reception method similar to that of the above (2), in which the data transmission method of FIG. 9 and the data reception method of FIG. 14 are used so that the data packet (all list packet) containing an information on the entire transmission data is transmitted along with packets formed by formatting the transmission data, and the received data and the content of the all list packet are compared at the receiving side so as to finish the reception only after the reception of all the data is completed.

<Eleventh Embodiment>

Now, the eleventh embodiment of the present invention will be described in detail. This eleventh embodiment is directed to a Web contents continuous display method based on the data transmission and reception method of the present invention as described above.

While the Internet has come to be utilized in a variety of fields, there are increasing number of services that enable to watch the real time information on the Web. However, when such a service is extended over a wide area, there arises problems concerning a processing power of a server and a traffic concentration. In view of these problems, a system for delivering the continuously changing Web contents to many terminal simultaneously can be constructed by utilizing the data transmission and reception method of the present invention so that it becomes possible to watch the divided contents continuously on many terminals simultaneously.

In this eleventh embodiment, a system configuration utilizing the teledome service as shown in FIG. 15 described above is used, where the transmitting side is set to be a center while the receiving sides are set to be user terminals. In this system, the simultaneous delivery from a single center to the user terminals in an order of several millions will be carried out in practice.

At the center, the files to be transmitted are modulated by the modem, and transmitted as speech signals. In the communication network, the speech signals (modulated sounds) from the center are delivered to many user terminal side modems by utilizing the teledome service. The user terminal side modem is adjusted to the modulation scheme at the center in advance and connected to the sound source channel of the teledome through the analog telephone line, so as to demodulate the received modulated signals. The demodulated data are restored into the files by a computer on the user terminal side, and the continuous display of the Web contents is carried out on this computer.

Note that the teledome is a uni-directional transmission from the center so that it is impossible to request the re-transmission from the receiving side even when the data transmission error occurs, and consequently there is a need to carry out a compensation processing by means of the repetitive transmission.

Now, with reference to FIG. 17, the Web contents continuous display method according to this eleventh embodiment will be described in further detail.

In this eleventh embodiment, the continuous contents are divided into short storage type contents along the time axis and sequentially transmitted from the center. At this point, at the center, a display time for displaying each content is specified within each content to the transmitted.

The user terminal is controlled to switch the display whenever the specified display time comes, so as to realize the continuous display. In order to set up this display time, there is a need for a unified management of a time for switching the transmitted contents and a time for carrying out the reception start operation.

Figure 17:
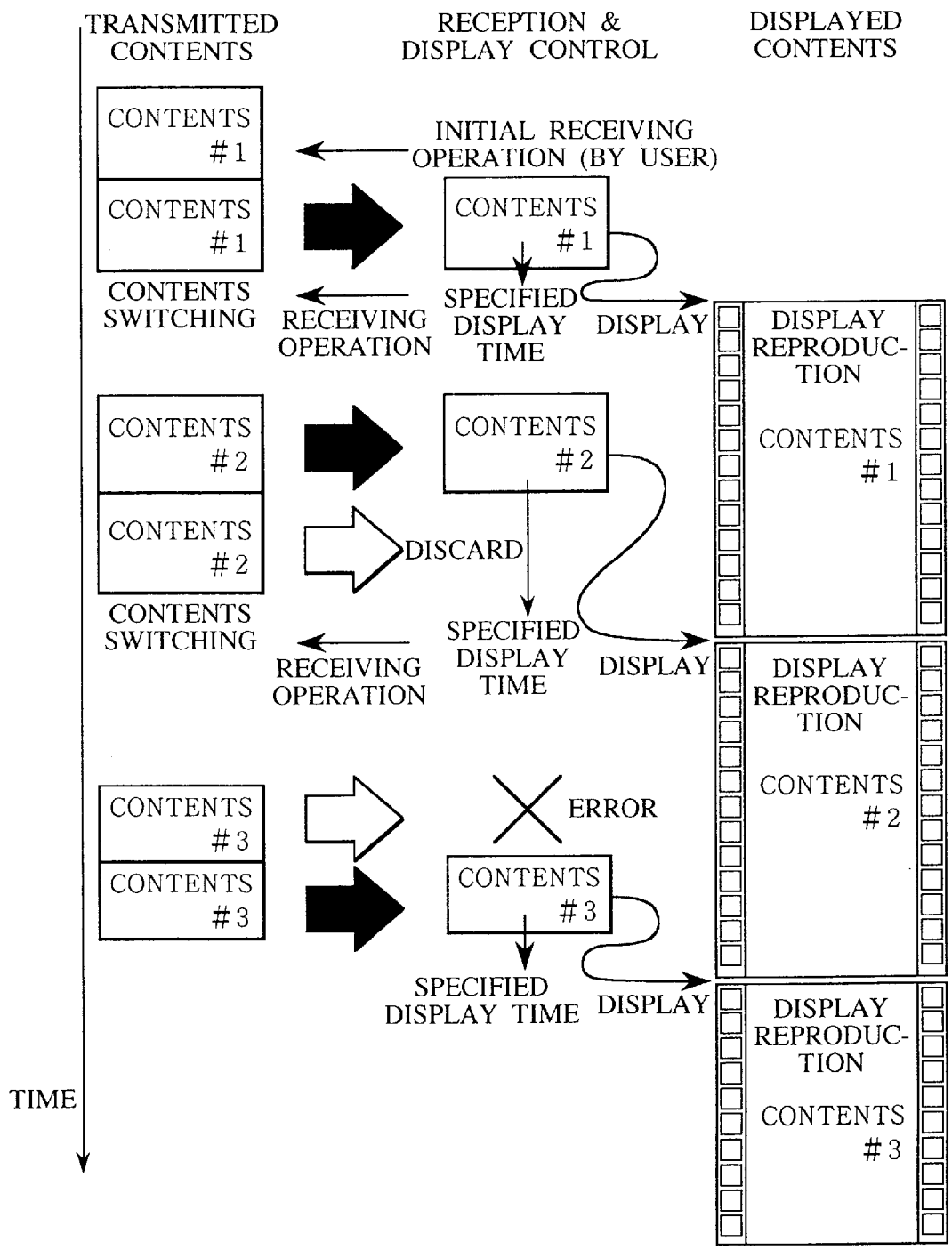
FIG. 17 is a diagram for explaining the Web contents continuous display method based on the data transmission and reception method of the present invention.

Namely, as shown in FIG. 17, the display switching time is acquired from the received content, and this content is displayed when this display switching time comes, while at the same time the reception of the content to be displayed next is started. Note that the time can be specified by utilizing the internal timer of each terminal, and the internal timer of each terminal is assumed to be accurately adjusted in advance. Note also that it is also possible to use the relative time instead of the absolute time, if desired.

In addition, up until the specified display time of each content to be transmitted, the center carries out the transmission of that content for a number of times specified in advance (twice in FIG. 17).

At the user terminal, in a case of the reception failure, the next transmitted content is received and this received content is displayed when the specified display time comes, while at the same time the reception of the next content is started. By means of this, even when there is a reception failure at the receiving side, it is possible to compensate this reception failure while the content is repeatedly transmitted, so that it is possible to realize the highly reliable data delivery.

By the above control, the user terminal carries out the display according to the specified display time, starting from the content that can be received without a reception failure. Once the display is started at one user terminal, this user terminal operates similarly as the other user terminals that have been carrying out the display continuously. Also, even when the burst error occurs at one user terminal, only the content at which the error occurred will not be displayed at this user terminal, and the display will be switched from the next content on at this user terminal, just like any other user terminals.

As described, in the first embodiment (FIGS. 1 and 2), the data transmission and the pause are made controllable by incorporating the pause operation at the signal conversion unit at a time of the data transmission. Also, in the sixth embodiment (FIGS. 10 and 11) and the seventh embodiment (FIGS. 12 and 13), the asynchronous data reception is made possible by starting the data demodulation after the pause detection. In addition, the simultaneous and asynchronous data transmission and reception with respect to a plurality of data reception devices can be realized by distributing the signals to be transmitted and delivering them to a plurality of receiving sides.

Also, in the second embodiment (FIGS. 3 and 4), a packet is used as a unit of transmission, and in the seventh embodiment (FIGS. 12 and 13), the received data are reconstructed from the data packet, so that the pause can be inserted in a unit smaller than a size of the data. In addition, the simultaneous and asynchronous data transmission and reception with respect to a plurality of data reception devices can be realized by distributing the signals to be transmitted and delivering them to a plurality of receiving sides.

Also, in the third embodiment (FIGS. 5 and 6), the efficiency and the reliability of the transmission and reception can be adjusted by changing a size of a packet for each data part. In addition, the simultaneous and asynchronous data transmission and reception with respect to a plurality of data reception devices can be realized by distributing the signals to be transmitted and delivering them to a plurality of receiving sides.

Also, in the fourth embodiment (FIGS. 7 and 8), the data transmission frequency can be adjusted by adjusting a frequency of repetition for each data part at a time of carrying out the repetitive data transmission. In addition, the simultaneous and asynchronous data transmission and reception with respect to a plurality of data reception devices can be realized by distributing the signals to be transmitted and delivering them to a plurality of receiving sides, while it is also possible to realize the data transmission and reception based on the priority order in view of the transmission errors, so that it is possible to improve the reception reliability for the important part of the data, for example.

Also, in the fifth embodiment (FIG. 9), the data transmission device transmits an information (all list) regarding the entire transmission data, and in the eighth embodiment (FIG. 14), the data reception device finishes the reception after receiving all the data according to the all list. In addition, the simultaneous and asynchronous data transmission and reception with respect to a plurality of data reception devices can be realized by distributing the signals to be transmitted and delivering them to a plurality of receiving sides, while it is also possible for each receiving side to finish the reception when all the data are received, so that it is possible to realize the sure and economical reception in a case where the reception operation is to be time charged, for example Thus, according to the present invention, it becomes possible to realize the simultaneous and asynchronous data transmission and reception with respect to a plurality of data reception devices by simply distributing the signals from a single data transmission device, at a time of carrying out the data transmission and reception between a single data transmission device and a plurality of data reception devices.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A data transmission and reception method for carrying out data transmission and reception between a data transmission device and unspecified many data reception devices that make asynchronous connections, comprising:

a first step for applying a prescribed signal conversion to a prescribed amount of transmission data to obtain transmission signals, and transmitting the transmission signals, at the data transmission device;

a second step for pausing the signal conversion for a prescribed period of time after the first step so as to provide a transmission pause state in the transmission signals which is to be utilized as a reception timing at each data reception device, at the data transmission device;

a third step for carrying out a repetitive transmission by repeating the first step and the second step, at the data transmission device;

a fourth step for detecting the transmission pause state provided in the transmission signals, at each data reception device; and a fifth step for receiving the transmission data by starting a data conversion of received transmission signals, by using the transmission pause state detected by the fourth step as a reception timing, at each data reception device;

wherein the first step transmits the transmission data formed by information contents, by specifying a display time by which each information content is to be displayed at each data reception device, and the fifth step acquires the display time specified for each information content contained in received transmission data and displays each information content when the display time comes while starting a reception of a next information content.

2. The data transmission and reception method of claim 1, wherein the first step formats the transmission data into one or more packets, and applies the signal conversion to the packets in an amount transmittable within a prescribed time and the method further comprises:

a sixth step for assembling the packets from data obtained by the data conversion of received transmission signals at the fifth step; and a seventh step for reconstructing the transmission data from the packets assembled a the sixth step.

3. The data transmission and reception method of claim 2, wherein the first step formats the packets for each data part constituting the transmission data, according to a packet size specified in advance for each data part.

4. The data transmission and reception method of claim 2, wherein the third step adjusts a transmission frequency for each data part constituting the transmission data, according to a repetition condition specified in advance for each data part, at a time of repeating the first step and the second step.

5. The data transmission and reception method of claim 2, wherein the first step also transmits an all list packet which contains an information regarding the transmission data as a whole, along with the packets of the transmission data, and the method further comprises a step for matching the transmission data received at the fifth step with the all list packet so as to check whether all data are received or not, and finishing a reception by the fifth step when a completion of a reception of all data is confirmed.

6. The data transmission and reception method of claim 1, wherein the third step carries out the repetitive transmission so that each information content is transmitted as many times as a number of times for transmitting each information content which is specified in advance for each information content, until the display time specified for each information content.

7. The data transmission and reception method of claim 6, wherein in a case of a reception failure for one information content, the fifth step receives said one information content at a time of a next transmission of said one information content in the repetitive transmission, and displays said one information content when the display time specified for said one information content comes.

* * * * *